United States Patent [19]

Banner

[11] Patent Number: 4,827,601
[45] Date of Patent: May 9, 1989

[54] ARMATURE WINDING METHOD AND APPARATUS

[75] Inventor: Alvin C. Banner, Kettering, Ohio

[73] Assignee: Statomat-Globe, Inc., Kettering, Ohio

[21] Appl. No.: 107,823

[22] Filed: Oct. 13, 1987

[51] Int. Cl.⁴ .......................................... H02K 15/09
[52] U.S. Cl. ..................... 29/597; 29/564.5; 29/564.6; 29/598; 29/736; 242/703; 242/705 B
[58] Field of Search ............... 29/597, 598, 732, 733, 29/735, 736, 33 L, 564.5, 564.6, 566.1; 242/7.05 R, 7.05 A, 7.05 B, 7.05 C, 7.03

[56] References Cited

U.S. PATENT DOCUMENTS

| | | | |
|---|---|---|---|
| 3,628,229 | 12/1971 | Biddison et al. | 29/205 C |
| 3,713,208 | 1/1973 | Doyle | 29/597 |
| 3,713,209 | 1/1973 | Biddison | 29/597 |
| 3,783,501 | 1/1974 | Biddison et al. | 29/597 |
| 3,785,034 | 1/1974 | Bucholtz | 29/205 |
| 3,812,577 | 5/1974 | Compton et al. | 29/597 |
| 3,857,172 | 12/1974 | George et al. | 29/597 |
| 3,921,284 | 11/1975 | Bucholtz et al. | 29/597 |
| 3,927,456 | 12/1975 | Dammar | 29/205 |
| 3,927,469 | 12/1975 | Dammar | 29/597 |
| 3,927,843 | 12/1975 | Dammar | 242/7.05 B |
| 4,027,827 | 6/1977 | Biddison | 242/7.05 B |
| 4,633,577 | 1/1987 | Banner | 29/597 |

FOREIGN PATENT DOCUMENTS 2013533  8/1979  United Kingdom .

Primary Examiner—Carl E. Hall
Attorney, Agent, or Firm—Roger S. Dybvig

[57] ABSTRACT

Wire trimmer blades having sharp edges are located at the forward end of the inner commutator shield of an armature winding machine. Clamps gripping the start and finish wires of the armature are moved to cause the wire segments gripped by the clamps to be stretched and then severed at the sharp edges.

4 Claims, 1 Drawing Sheet

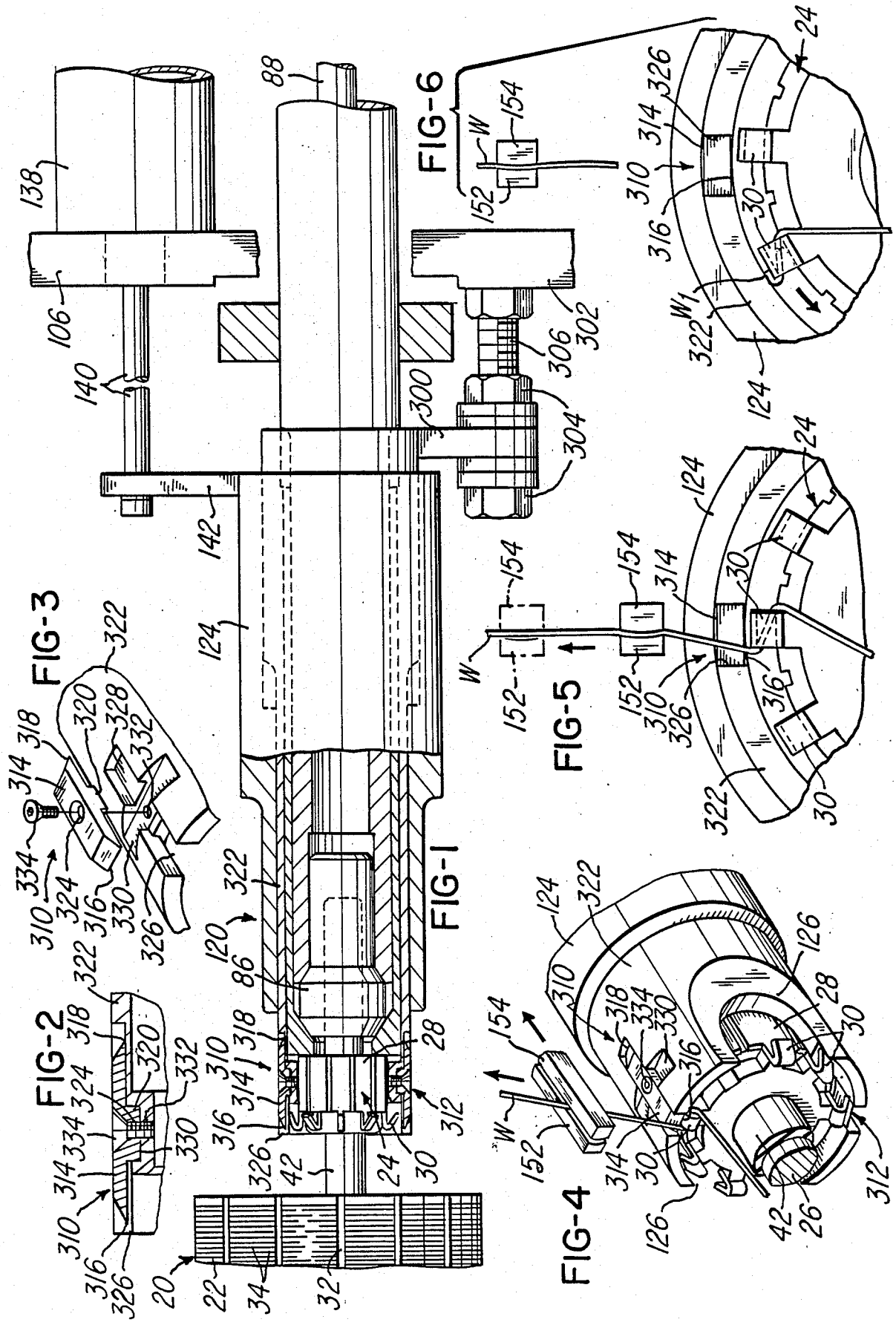

ARMATURE WINDING METHOD AND APPARATUS

This invention relates to an armature winding method and apparatus and especially to the severing of lead wires of armatures wound by an automatic double flier winding machine. As will become apparent, the invention is equally applicable to single flier winding machines.

The present invention is intended for use in the winding of armatures of the type having an armature core and a commutator mounted in spaced relation on an armature shaft and wherein the commutator is provided with coil lead-receiving hooks or tangs. As used herein, the term "start wires" refers to the wire segments leading to the first coils wound by the fliers. The term "finish wires" refers to the wire segments extending from the last coils wound. In double flier armature winding machines having two fliers, there are two start and two finish wires.

Various methods have been used to sever the wire segments between the fliers and the armatures being wound. For the last several years, it has been a common practice to equip winding machines with mechanisms for severing the start and finish wires close to the commutator tangs while the armature being wound is located in the winding station.

U.S. Pat. No. 3,812,577, granted to Jerry L. Compton and David R. Seitz on May 28, 1974, discloses an approach to the severing of the coil lead wires from an armature while it is located in the winding machine wherein either one or both of the start and the finish wires are severed by relative movement of wire clamps gripping the wires and the armature. As a result of such relative movement, the wires are stressed at the tangs and severed at or quite near the edges of the tangs. Accordingly, there is no excess wire left extending from the tangs and further trimming operations are unnecessary.

My U.S. Pat. No. 4,633,577, granted Jan. 6, 1987, discloses a method and apparatus by which either one or both of a start wire and a finish wire can be reliably severed closely adjacent its associated commutator tang by positioning a sharp trimming edge of a trimmer member immediately adjacent such tang with the wire to be severed extending across the trimming edge, and moving a wire clamp that grips the wire away from the trimmer member whereupon the wire becomes stretched and breaks at the trimming edge because of the high stress concentration experienced by the wire at that point. The trimming edge can be accurately machined to a sharp edge so that the stress concentration in the wire at the trimming edge is exceedingly high. Accordingly, the wire breaks at the trimming edge a very high percentage of the time. The drawings and the entire description of my said U.S. Pat. No. 4,633,577, are hereby incorporated by reference herein.

It is now conventional in flier-type armature winding machines to have a shield assembly including an inner shield and an outer shield. The inner shield is notched to expose a pair of commutator tangs for making lead wire connections. The outer shield covers the commutator tangs exposed through the inner shield notches to prevent the wire segments extending from the fliers from engaging the aforementioned commutator tangs, the outer shield being retracted from the path of the wire segments when the lead wire connections are to be made. The trimming members disclosed in my U.S. Pat. No. 4,633,577 are coupled to the outer shield so that the trimming members are appropriately moved into and out of position for the wires to be severed in response to movements of the outer shield. When moved out of their wire-severing positions, the trimming members are located so as not to interfere with the winding of coils. Each wire trimming member is supported by a pivotally mounted arm and a driving connection is provided between the arm and the outer shield whereby each arm is caused to pivot in response to movements of the outer shield.

An object of this invention is to provide an improved method and apparatus for severing coil lead wires from an armature. More particularly, it is an object of this invention to provide another method and apparatus using wire trimmer members in association with movable wire clamps for severing the lead wires against a sharp edge as in my U.S. Pat. No. 4,633,577. In this case, however, the wire trimmer members are at the end of the inner shield facing the armature core whereat they may be located an extremely short distance radially outwardly of the commutator tangs engaged by the start and finish wires. The wire trimmer members of this invention need have no moving parts, and they offer the advantages of durability or long life, reliability, simplicity, cost savings, and ease and reliability of adjustment. Further, the wire trimmer members of this invention require no additional space over that required for conventional shield assemblies and wire clamps so that they may be used when the available space does not permit of the use of the wire trimmer members of my U.S. Pat. No. 4,633,577. Not all armatures can be wound using the trimmer members and method of this invention, but they are clearly preferred when circumstances permit of their use.

Other objects and advantages will become apparent from the following description and the drawings.

BRIEF DESCRIPTION OF THE DRAWINGS

FIG. 1 a simplified, fragmentary side elevational view, with parts broken away, of a portion of an armature winding machine in accordance with this invention.

FIG. 2 is a fragmentary cross-sectional view of a portion of the machine of FIG. 1.

FIG. 3 is a fragmentary, exploded perspective view showing the same parts of the machine shown in FIG. 2.

FIG. 4 is an enlarged perspective view of portions of the armature and the winding machine and illustrating parts in readiness for the severing of a finish wire.

FIG. 5 is a simplified, fragmentary elevational view of a portion of the commutator and parts of the winding machine illustrating the relationship of the start wire tang to the finish wire and the inner shield in the position also illustrated in FIG. 4.

FIG. 6 is a view similar to FIG. 5 illustrating the parts after the finish wire has been cut.

DETAILED DESCRIPTION

Referring to FIGS. 1 and 4, this invention is directed to an improved method and apparatus for winding the type of armature, generally designated 20, having a laminated core 22 and a commutator 24 mounted on an armature shaft 26. The commutator 24 has a plurality of circumferentially spaced commutator segments 28 terminating in tangs 30 adjacent one end of the laminated core 22. The core 22 has a plurality of radially extending, outwardly opening, coil-receiving slots 32 separated by T-shaped teeth 34 which receive coil windings (not shown). As well known, the coil windings are wound from insulated wire and are completely isolated from the armature core 22 and the shaft 26 by plural insulating members including an insulating sleeve 42 between the core 22 and the commutator 24. Here it may be noted that the reference numbers used in the instant application are, where applicable, the same as those used in my said U.S. Pat. No. 4,633,577. Reference numbers 300 and above are used herein to refer to parts of the machine hat differ substantially from parts shown in the U.S. Pat. No. 4,633,577, or are not illustrated therein, or to parts that are new with the invention described herein.

The parts of the winding machine illustrated in FIG. 1 hereof include a collet 86 operated by a collet compression rod 88 for gripping the end of the armature shaft adjacent to the commutator 24, the construction and operation of which may be entirely conventional and form no part of this invention. Further details of operation and construction are disclosed in my said U.S. Pat. No. 4,633,577 patent.

The armature winding machine illustrated herein further includes a commutator shield generally designated 120 comprising an inner shield 322 and an outer shield 124. The inner shield 322 comprises a hollow, cylindrical or tubular body member that surrounds the commutator 24 and has a pair of opposed, tang-exposing notches 126 in its forward end, i.e., the end closest to the winding forms 62 and 64. The purpose of the inner shield notches 126 is to expose two diametrically opposed commutator tangs 30, such tangs being termed "terminal tangs" herein, located in positions wherein the start and finish wires can be connected to them. In the machine 60, the terminal tangs are located in the generally horizontal plane which are referred to as the "3:00 o'clock" and the "9:00 o'clock" positions when coil lead wire connections are to be made to the tangs 30.

The inner shield 322 is located in an adjustably fixed position, moving neither axially nor rotatably. For this purpose, the rearward end of the inner shield 322 has a depending arm 300 connected to a bracket 302 or other fixed part of the machine by a pair of adjusting nuts 304 and a bolt 306, the operation of which is obvious. Once a proper adjustment is obtained, further movement or adjustment of the position of the inner shield 322 will ordinarily be unnecessary. Here it may be observed that the embodiment of the winding machine illustrated herein, in contrast to the machine shown in my said U.S. Pat. No. 4,633,577, is not constructed to practice the invention described in my U.S. Pat. No. 4,459,742, issued July 17, 1984, and therefore, the inner shield 322 illustrated herein does not have the rearwardly extending portion 128 forming part of the inner shield 122 shown in my said U.S. Pat. No. 4,633,577. However, it will be apparent to those skilled in the art that the invention described herein could, by suitable modification of parts, also be used with the invention of my '742 patent.

The outer shield 124 is advanced and retracted from a commutator tang shielding position by an outer shield actuator 138 mounted on the front frame plate 106 and having a piston rod 140 connected to a bracket 142 that is connected to or integral with the outer shield 124. For reasons that will become apparent from the ensuing description, the outer shield actuator 138 is capable of positioning the outer shield 124 selectively in either a fully extended position or in a fully retracted position. Briefly, in its fully extended position, shown in FIGS. 3 and 4 of my said U.S. Pat. No. 4,633,577, the end of the outer shield 124 confronting the armature core 22 surrounds the corresponding end of the inner shield 322 and, accordingly, shields the commutator tangs 30 otherwise exposed by the inner shield notches 126. In its fully retracted position, shown in FIGS. 1 and 4 herein, such end of the outer shield is positioned in a location spaced further from the armature core 22 and exposes a substantial length of the inner shield 322, including the inner shield notches 126 and therefore also exposes the commutator tangs 30 aligned therewith.

This invention also uses the pivotally mounted wire clamps, including the clamp 150 with the relatively fixed clamp jaw 152 and the relatively movable clamp jaw 154, the clamp operating actuator 158, the clamp pivoting actuator 166, and related parts described in my said U.S. Pat. No. 4,633,577, at column 6, line 22 through column 7, line 3. For simplicity, the drawings herein include only a diagramatic representation of the clamp jaws 152 and 154.

The machine of my said U.S. Pat. No. 4,633,577 uses an upper wire trimming assembly 180 and a lower wire trimming assembly 182 in cooperation with the wire clamps. Such wire trimming assemblies are not used in accordance with this invention. Rather, the forward end portion of the inner shield 322, i.e., the portion adopted to overlie the tangs 30 of an armature in the winding station of this invention, is provided with a pair of diametrically opposed cutter assemblies, generally designated 310 and 312, that are circumferentially spaced, preferably by substantially 90 degrees, from the inner shield notches 126. The two cutter assemblies 310 and 312 are mutually identical and only the upper or "12:00 o'clock" assembly 310 is illustrated and described in detail herein.

With reference to FIGS. 2, 3, and 4 herein, the cutter assembly 310 comprises an elongate, generally rectangular, and generally flat cutting blade 314 having sloping end faces terminating in sharp cutting edges 316 and 318 at its opposite ends. Blade 314 has a rectangular, downwardly projecting, lug or key 320 at its mid-section and a counterbored bore 324 passing centrally through the blade 314 and its key 320. Cutter blade 314 is mounted on the forward end of the inner shield 322 as follows. The forward end of the inner shield 322 has a wire-locating notch 326 at the 12:00 o'clock cutter assembly location, the notch 326 being bounded by the body of the inner shield 322. Extending rearwardly from and aligned with the notch 326 is an axially extending recess 328 in the outer surface of the inner shield 322. A milled groove 330 is cut transversely across the recess 328 to a depth greater than the depth of the axially extending recess 328. A tapped hole 332 is formed centrally of the milled groove 330 and a flat head screw 334 extends through the bore 324 and threadedly engages in the tapped hole 332 to secure the cutter blade 314 in the notch 326 and the recess 328, and also to secure the key 320 in the transverse groove 330. Because the transverse groove 330 is slightly deeper than the recess 328, and the key 320 fits snugly therein, and further because the cutter blade 314 is snugly received in the notch 326 and the recess 328, the blade 314 is quite securely affixed to the inner shield 322.

Preferably, as shown in the drawings, the forward-most edge 316 of the cutter blade 314 is recessed slightly from the end edge of the inner shield 322 so that a wire segment to be severed will be restrained from sliding out of engagement with the cutting edge 316 by the margins of the notch 326. As is apparent, the cutter blade 314 may be removed from the inner shield 322 and replaced in a reversed orientation to locate its opposite sharp edge 318 in position for severing the wire. Thus, as the edge 316 becomes worn through use, the opposite edge may be brought into use.

With reference to FIGS. 3, 4, and 5, the method of severing a finish wire W is illustrated. To avoid a confusion of lines, the prior windings and commutator connections are not illustrated in the drawing. Before the parts have reached the position shown in FIGS. 4 and 5, the finish wire has been looped about the terminal tang and the armature rotated to the bring the extension of the finish wire W to the flier (not shown) where it is gripped by the clamp jaws 152 and 154. During such armature rotation, the outer shield 124 has been extended. It is then retracted as shown in FIG. 4. The clamp jaws 152 and 154 are then abruptly moved away from the sharp edge 316 in both an upwardly and a rearwardly direction, as indicated by the arrows in FIGS. 4 and 5. The translated position of the jaws 152 and 154 is shown by phantom lines in FIG. 5 and by full lines in FIG. 6. During this movement, the section of the wire W engaged with the sharp edge 316 is stretched and then breaks under stress. The armature core may then be rotated in the direction of the arrow shown in FIG. 6, whereupon the severed end, designated $W_1$, of the wire W is forcibly bent over the terminal tang 30 by the inside surface of the inner shield.

It is to be understood that there is another wire (not shown) engaged with the sharp cutter edge located at the 6:00 o'clock position which will be severed at the same time and in the same way by a duplicate wire clamp assembly. It is also to be understood that the same apparatus and method used to sever the finish wires may be used for severing start wires engaged around the terminal tangs.

It may be observed that, although both movements of the clamp jaws indicated by the arrows in FIGS. 5 and 6 may be accomplished by pivoting the clamps as described in my said U.S. Pat. No. 4,633,577, it will often be necessary to cause a separate rearward movement of the clamp jaws at the same time the clamp assemblies are pivoted. This is readily done by programming the machine controls to cause the clamp actuator 158 shown in my said U.S. Pat. No. 4,633,577, to partly withdraw the clamp jaws at the same time as the clamp pivoting actuator 166 causes the clamp jaws to pivot away from the sharp edges.

Normally, the cutter blades 314 will be so constructed that their cutting edges will be essentially aligned with the inner diameter surface of the inner shield 322. There may be circumstances, however, when it may be advantageous to have the cutting edge located slightly further radially outwardly.

Although the presently preferred embodiment of this invention has been described, it will be understood that various changes may be made within the scope of the appended claims.

I claim:

1. In an armature winding machine for winding an armature of the type having an armature shaft, a core having coil-receiving slots mounted on said shaft, and a commutator mounted on said shaft, said commutator having coil lead-receiving tangs,
   said armature winding machine having a winding station, means for holding an armature in said winding station,
     at least one wire guiding flier for winding coils of wire in said coil-receiving slots,
     a commutator shield construction comprising a tubular inner shield for receiving a commutator of an armature being wound and having an end portion for overlying the commutator tangs of an armature, said end portion having at least one notch exposing at least one of said commutator tangs for permitting the hooking or looping of wire about said at least one of said commutator tangs,
     a tubular outer shield surrounding said tubular inner shield, and
     means for moving said outer shield relative to said inner shield,
   wire clamp means actuated to grip a stretch of wire extending from said flier at the end of the winding of one armature in said winding station until the commencement of the winding of the next armature in said winding station, and drive means for moving said wire clamp means along at least one path lying substantially in a plane intersecting said inner shield,
   the improvement wherein
     said end portion of said inner shield comprises wire trimmer means comprising a sharp edge facing toward said core of an armature in said winding station,
     said wire trimmer means being so located on said inner shield that a wire segment engaged both with a tang of said armature and said wire clamp means may be brought into engagement with said wire trimmer means by movement of said wire clamp means substantially in said plane, and
     means are provided for moving said wire clamp means substantially in said plane to cause said wire simultaneously to be drawn against said sharp edge and stretched by movement of said wire clamp means so that said wire is severed at said sharp edge.

2. The improvement of claim 1 wherein said sharp edge is recessed from the end wall of said inner shield to prevent said wire segment from sliding off said sharp edge.

3. The improvement of claim 1 wherein said sharp edge is on an end of a blade affixed to said inner shield.

4. In a method using an armature winding machine for winding an armature of the type having an armature shaft, a core having a coil-receiving slots mounted on said shaft, and a commutator mounted on said shaft, said commutator having coil lead-receiving tangs,
   said armature winding machine having
     a winding station,
     means for holding an armature in said winding station,
     at least one wire guiding flier for winding coils of wire in said coil-receiving slots,
     a commutator shield construction comprising
       a tubular inner shield for receiving a commutator of an armature being wound and having an end portion for overlying the commutator tangs of an armature, said end portion having at least one notch exposing at least one of said commutator tangs for permitting the hooking or looping of wire about said at least one of said commutator tangs, a tubular outer shield surrounding said tubular inner shield, means for moving said outer shield relative to said inner shield, wire clamp means actuated to grip a stretch of wire extending from said flier at the end of the winding of one armature in said winding station until the commencement of the winding of the next armature in said winding station, and drive means for moving said wire clamp means along at least one path lying substantially in a plane intersecting said inner shield, the steps of engaging a wire segment about one of said commutator tangs of an armature core in said winding station, gripping said wire segment by said wire clamp means, and moving said wire clamp means substantially in said plane thereby to draw said wire segment against a sharp edge facing said core of wire trimmer means provided on said end portion of said inner shield and simultaneously to stretch said wire segment so that said wire segment is severed at said sharp edge.

* * * * *